May 13, 1924.
W. H. MORRIS
VELOCIPEDE
Filed Oct. 7, 1922    5 Sheets-Sheet 3
1,493,496
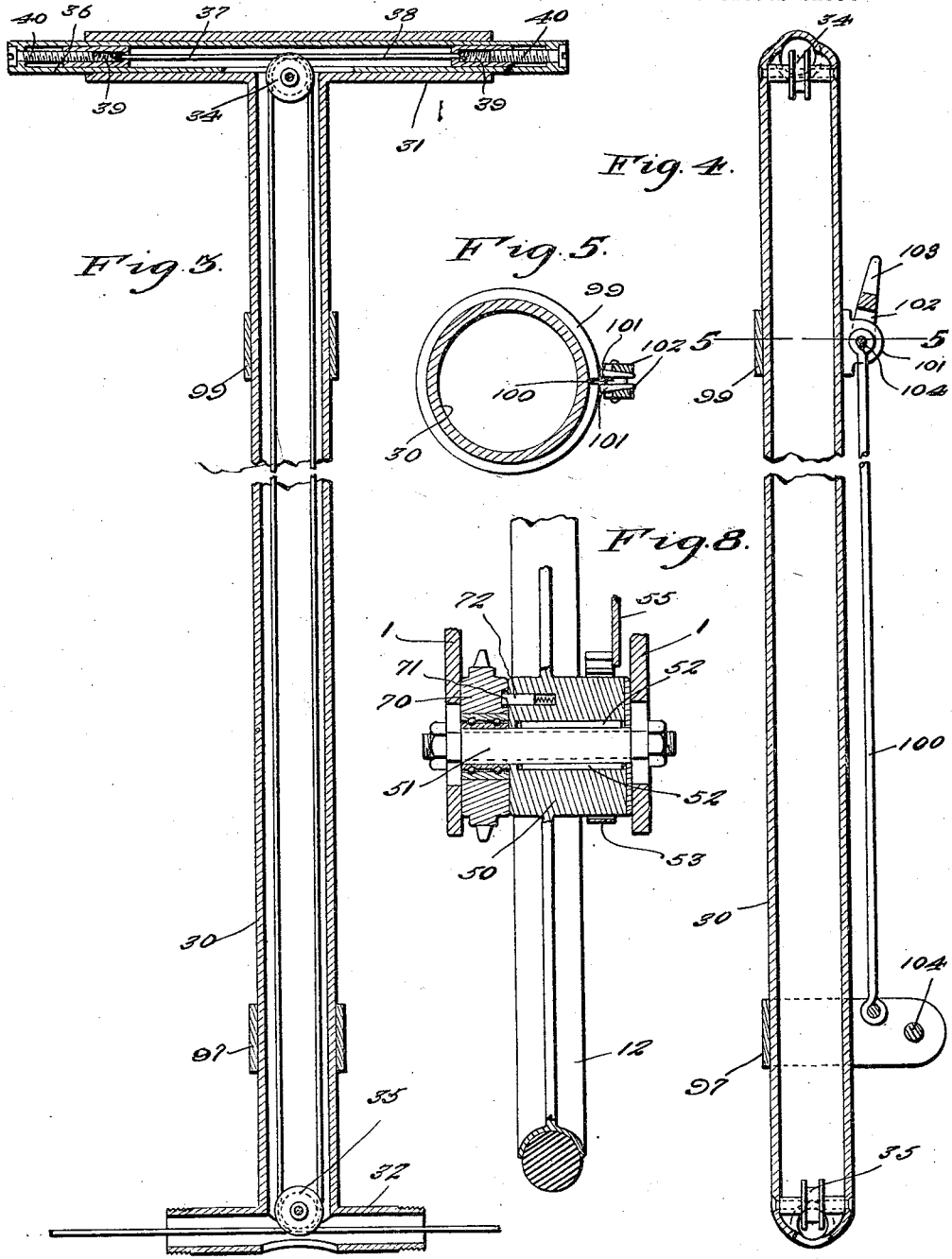

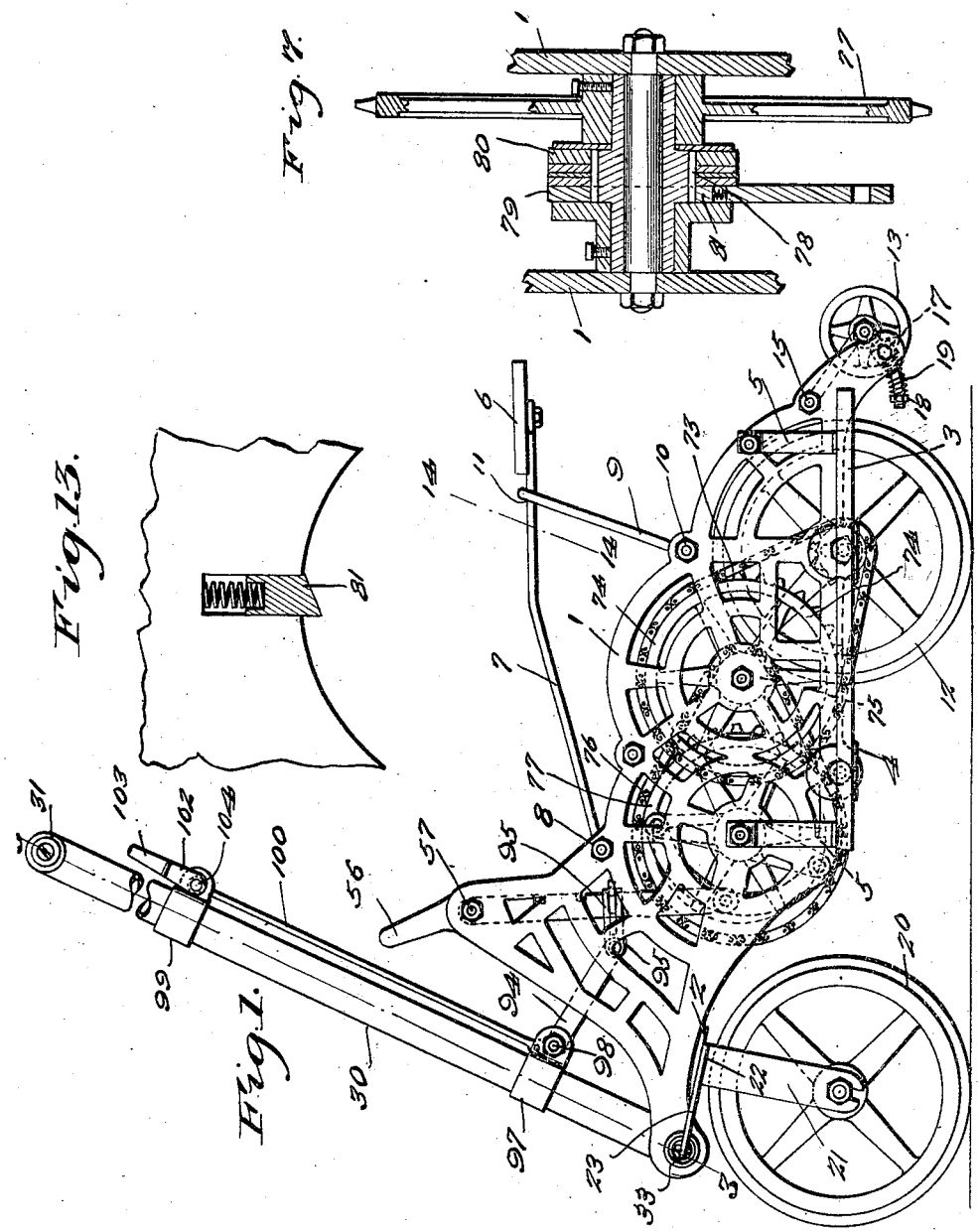

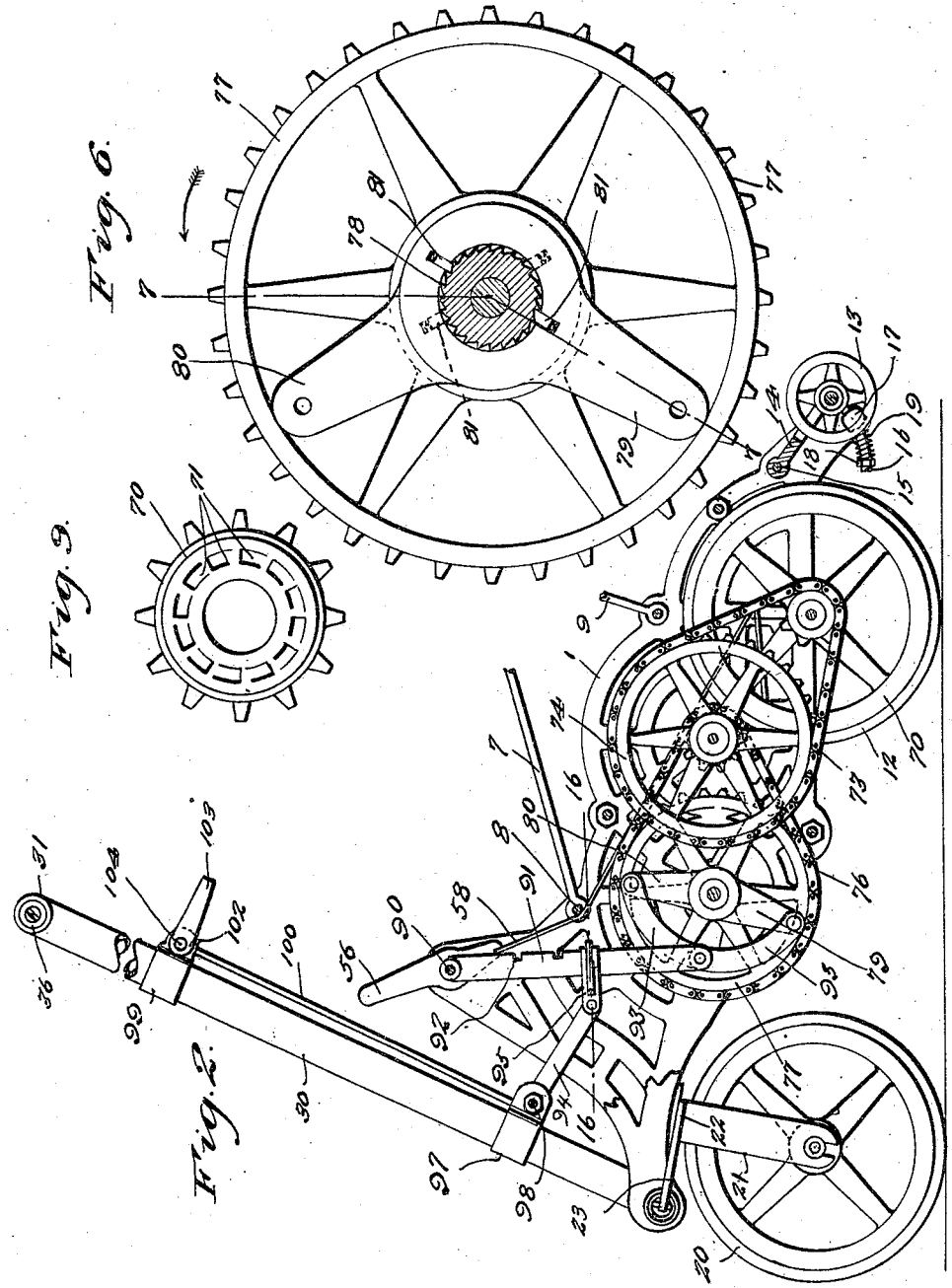

May 13, 1924.
W. H. MORRIS
VELOCIPEDE
Filed Oct. 7, 1922
1,493,496
5 Sheets-Sheet 4
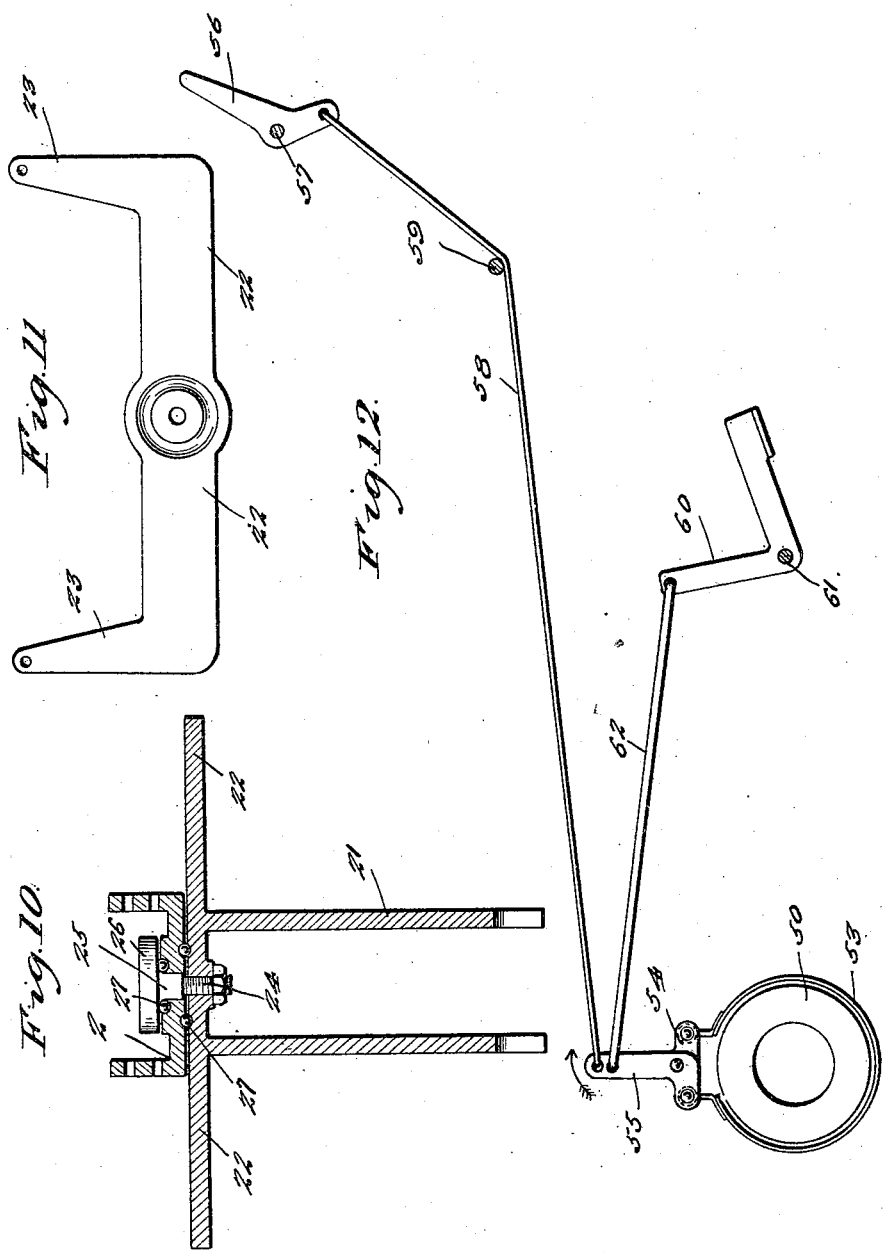

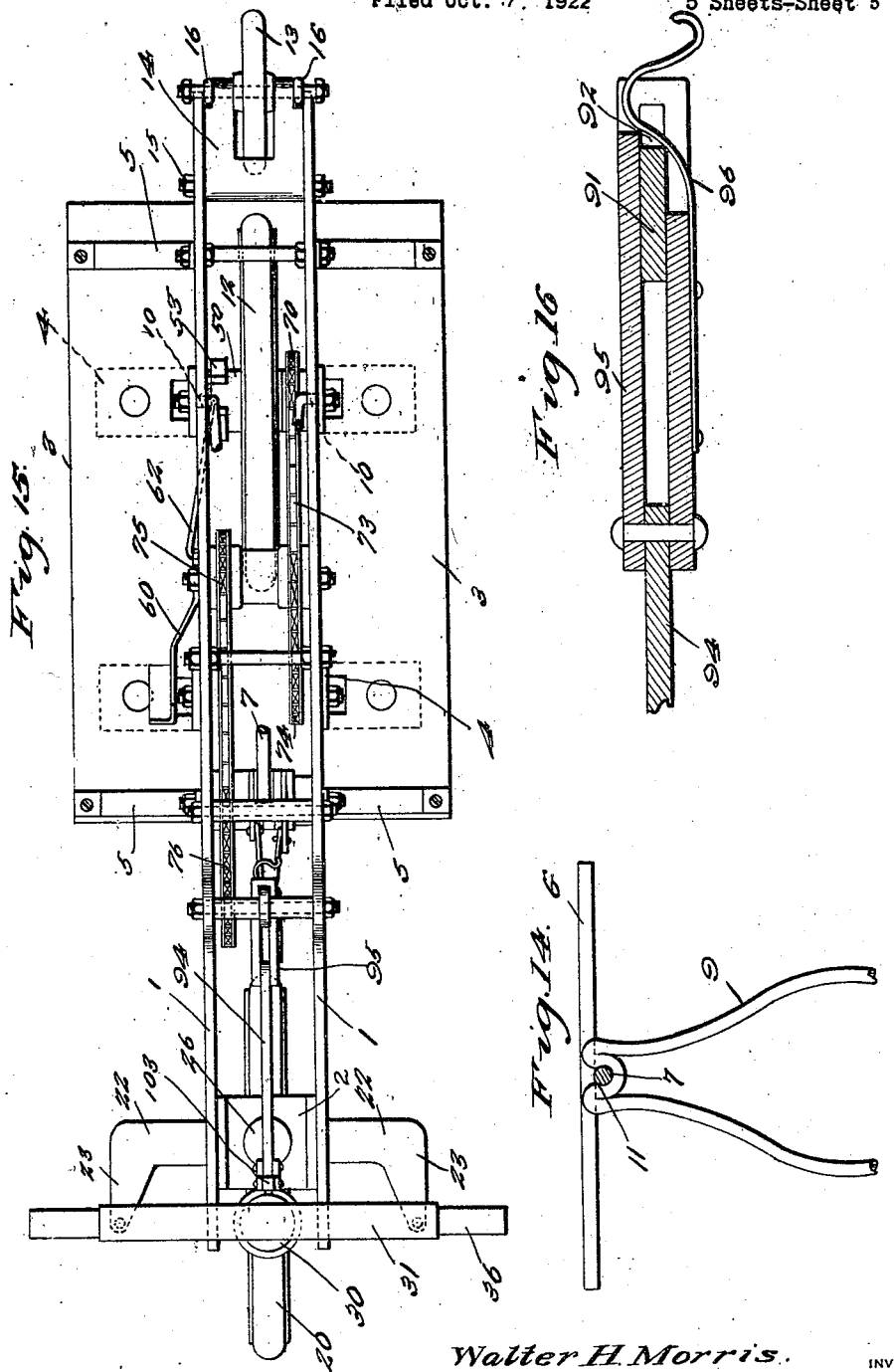

Patented May 13, 1924.

1,493,496

UNITED STATES PATENT OFFICE.

WALTER H. MORRIS, OF JOHNSON CITY, TENNESSEE.

VELOCIPEDE.

Application filed October 7, 1922. Serial No. 593,024.

*To all whom it may concern:*

Be it known that I, WALTER H. MORRIS, a citizen of the United States, residing at Johnson City, in the county of Washington and State of Tennessee, have invented new and useful Improvements in Velocipedes, of which the following is a specification.

The object of my said invention is the provision of a velocipede, designed more particularly, though not necessarily, for the use of children with a view to affording recreation and amusement, and embodying such a construction that it is susceptible of being easily operated at a high rate of speed and is also susceptible of being readily steered, adjusted and controlled.

To the attainment of the foregoing, the invention consists in the improvement as hereinafter described and definitely claimed.

In the accompanying drawings, forming part of this specification:—

Figure 1 is a side elevation of the velocipede constituting the best practical embodiment of my present invention that I have as yet devised.

Figure 2 is a similar view with one of the frame plates of the velocipede removed.

Figure 3 is an enlarged detail section of the steering mechanism, taken in the plane indicated by the line 3—3 of Figure 1.

Figure 4 is a section of the same taken at right angles to Figure 3.

Figure 5 is an enlarged cross-section on the line 5—5 of Figure 4.

Figure 6 is a detail enlarged view showing the forward sprocket gear and the ratchet provision associated therewith.

Figure 7 is a cross-section of the same on the line 7—7 of Figure 6.

Figure 8 is an enlarged detail section showing the mechanism associated with the rear, drive wheel of the velocipede.

Figure 9 is a side elevation of the sprocket gear associated with said rear drive wheel.

Figure 10 is an enlarged detail section showing the fork for the forward steering wheel, and also showing the manner in which said fork is connected with the frame of the velocipede.

Figure 11 is a top plan view of the fork.

Figure 12 is an enlarged detail view showing the brake means of the velocipede as it appears from a view point at the top of Figure 15.

Figure 13 is an enlarged detail section taken at right angles to Figure 6 and illustrating the manner of mounting the dogs of the ratchet construction.

Figure 14 is a fragmentary section on the line 14—14 of Figure 1 to show the manner of supporting the velocipede seat.

Figure 15 is a complete top plan view of the velocipede with the seat in lowered and idle position.

Figure 16 is an enlarged detail section taken in the plane indicated by the line 16—16 of Figure 2.

Similar numerals of reference designate corresponding parts in all of the views of the drawings.

Among other elements my novel velocipede comprises side by side frame plates 1 which are arranged vertically in parallelism, and are preferably of open work construction and are shaped as illustrated. Near their forward ends the plates 1 are connected by a cross plate 2 which may be integral with the side plates 1 or may be appropriately connected in fixed manner thereto, in the discretion of the manufacturer. At their sides the said side plates 1 are equipped with longitudinal platforms 3 which are superimposed upon and secured to lateral brackets 4 on the side plates, and are also connected to hangers 5 on the outer sides of the side plates. The said platforms 3 are provided in order to enable a child to conveniently stand on and be carried by the velocipede when the child is operating the velocipede in standing position. At this point I would have it understood that when desired the platforms 3 may be utilized merely as foot rests, and the velocipede may be operated by a child disposed on a seat 6. The said seat 6 is carried by a vertically swinging arm 7, pivotally connected at 8 between the side plates 1, and when the seat 6 is to be used, a swinging support 9 is moved to the position shown in Figure 1, the said support 9 being pivotally connected at 10 between the side plates 1 and being provided in its upper end with a bifurcation 11 to receive the arm 7 at a point adjacent to the seat 6, with a view to adequately supporting the arm 7 and the seat 6 and at the same time precluding lateral deflection of the seat 6 and the arm 7. The support 9 is preferably of bail shape as illustrated in Figure 14, and the bifurcation 11 is afforded by bending the upper portion of the metallic bar of which the support 9 is formed. Manifestly when the support 9 is swung forwardly and downwardly, the seat 6 and the arm 7 may be swung downwardly until the seat 6 brings up against the upper edges of the frame plates 1 when the support 9 and the seat 6 will be entirely out of the way of the child while operating the velocipede in standing position.

My novel velocipede is capable of being tilted on the axis of the rear ground or drive wheel 12 as a center, and in order to support the rear end portion of the velocipede when the same is so tilted I provide the auxiliary wheel 13. The said wheel 13 is appropriately mounted in a hanger 14, pivotally connected at 15 between the frame plates 1, and in order to cushion the said wheel 13 when its tire contacts with the ground I provide the hanger 14 with downwardly and forwardly curved rods 16 which are extended through apertured lugs 17 on the frame plates 1 and are equipped with nuts 18 and with coiled cushion springs 19, the said springs 19 being mounted on the rods 16 and interposed between the lugs 17 and the nuts 18 as clearly illustrated. Manifestly when the auxiliary wheel 13 springs down against the ground, the spring 19 will be compressed to serve the purpose indicated.

In addition to the drive wheel 12 and the auxiliary wheel 13 the velocipede comprises a forward steering wheel 20. All of the wheels 12, 13 and 20 are preferably, though not necessarily, equipped with rubber tires as illustrated. The said steering wheel 20 is appropriately mounted in a fork 21, and at the upper end of the fork lateral arms 22 are provided, said arms 22 being equipped with forwardly reaching portions 23. The fork 21 is pivotally connected at 24 to the frame portion 2, a king bolt 25 with a head 26 being preferably employed, Figure 10, and anti-frictional balls 27 being interposed between the frame portion 2 and the upper portion of the fork 21, and also between the frame portion 2 and the bolt head 26 as shown so as to render easy the turning of the fork and the steering of the velocipede. By particular reference to Figures 11 and 15 it will be noted that when the velocipede is being operated by a child on the seat 6, the child with its feet bearing against the arms 22 of the fork 21 is enabled to conveniently steer the velocipede.

At 30 is the oscillatory operating lever of the velocipede, the said lever being tubular, Figures 3 and 4, and being provided at its upper end with a tubular T-head or handle 31, and at its lower end with a tubular T-portion 32. The said T-portion 32 affords journals at opposite sides of the lever 30 which is designed and adapted to be oscillated longitudinally and vertically between the forward portions of the frame plates 1, the said journal portions being arranged in appropriate bearings 33 carried in the said forward portions of the frame plates. Upper and lower sheaves 34 and 35 are mounted in the upper and lower portions of the tubular lever 30, and a plunger 36 is arranged and adapted to be moved rectilinearly in the tubular T-head 31 of the lever. Appropriately connected to portions of the plunger 36 at opposite sides of the lever 30 are cables 37 and 38, each of the said connections preferably comprising a threaded slide 39 and a headed screw 40 engaging the said slide and bearing against one end of the plunger 36 so as to afford a ready means for taking up slack of the cable and tensioning the cable so as to produce the best results. From their connections to the plunger 36 the cables 37 and 38 are carried in opposite directions over the sheave 34 which is circumferentially grooved, and from the sheave 34 the cables are carried downwardly within the lever 30, and are then carried in opposite directions about the sheave 35 and outwardly through the tubular portions 32 and are connected at their ends to the forwardly reaching portions 23 on the arms 22 of the fork 21. Obviously when the operator of the velocipede moves the plunger 36 endwise in one direction, the wheel 20 will be swung in the opposite direction, and from this it follows that through the medium of the plunger 36 the operator is enabled to steer the velocipede conveniently, particularly when the operator is driving the velocipede while standing on the platforms 3. In this connection it will be noted that when one of the cables is moved upwardly in the tubular lever 30, the other cable will be moved downwardly in said lever 30.

The hub of the rear drive wheel 12 is clearly shown in Figure 8, and is designated by 50. Said hub surrounds an axle 51 adjustably secured by preference in the frame plates 1, and the hub also surrounds by preference appropriate anti-friction bearings 52 interposed between it and the axle 51. The hub is preferably of metal, and partially surrounding said hub adjacent to the right hand frame plate 1 is a brake band 53, one end of which is connected to a lug 54, Figure 12, carried by the adjacent frame plate 1. Fulcrumed on the said lug 54 or on any other appropriate support is an angular lever 55 to the lower arm of which the opposite end of the brake band 53 is connected. Manifestly when the lever 55 is moved in the direction indicated by arrow in Figure 12 the brake band 53 will be powerfully applied to the hub 50 to retard rotation of the wheel 12 and brake the velocipede, and when the said lever 55 is permitted to move in the opposite direction the brake band 53 will relieve the hub 50 of pressure. I prefer to employ two equipments for the braking movement of the lever 55, one of the said equipments comprising a hand lever 56 fulcrumed at 57 between the forward portions of the frame plates 1 and a cable 58, appropriately guided at 59 and interposed between and connected to the hand lever 56 and the lever 55. The other equipment comprises a pedal lever 60 pivoted at 61 to one of the frame plates 1, adjacent to one of the platforms 3, and a cable 62 interposed between and connected to the lever 60 and the lever 55. In operation it is optional with the operator of the velocipede to use either of the brake applying means described when it is necessary to retard the velocipede. I would have it understood, however, that my invention contemplates the use of the lever 56 when the operator is seated, and the lever 60 when the operator is standing. Also mounted on the axle 51 so as to turn about the same is a sprocket gear 70, Figures 8 and 9. In the inner face of the said sprocket gear 70 are provided a circular series of beveled teeth 71, and it will be noted here that the hub 50 of the drive wheel 12 is provided with a spring-pressed dog 72 to cooperate with the said teeth 71. This provision is advantageous inasmuch as the beveled teeth 71 are so disposed that forward rotation of the wheel 12 will attend forward rotation of the sprocket gear 70, and yet when the sprocket gear 70 is not rotated as when the velocipede is coasting, the dog 72 will idle over the series of teeth 71.

In the preferred embodiment of my invention the sprocket gear 70 is driven by a sprocket belt 73, from a comparatively large sprocket gear 74 mounted between the frame plates 1, and fixed with respect to the sprocket gear 74 is a smaller sprocket gear 75. This latter sprocket gear is designed to be driven by a sprocket belt 76 from a larger sprocket gear 77, said sprocket gear 77 being shown in detail in Figures 6 and 7.

Obviously when the sprocket gear 77 is rotated in the direction indicated by arrow in Figure 6, the rear, drive wheel 12 will be rotated at a high rate of speed for the propulsion of the velocipede. By comparison of Figures 6 and 7 it will be noted that the sprocket gear 77 is fixed with respect to a ratchet 78, and that the said ratchet 78 is loosely surrounded by the body portions of two levers 79 and 80. The said levers 79 and 80 are independently movable, and they are provided with reversely arranged spring-pressed pawls 81 (see Figure 6), and from this it follows that when one of the said levers is moved forwardly it will rotate the sprocket gear 77 in the direction of the arrow in Figure 6, while similar movement of the said sprocket gear 77 will attend rearward movements of the other lever. From this it also follows that the sprocket gear 77 will first derive motion from one lever and then from the other with the result that the rotation of the sprocket gear 77 in the direction indicated by arrow in Figure 6 will be practically continuous and even as is desirable.

Pivotally connected at 90 between the frame plates 1 is a pendent vertically swinging lever 91, having notches 92 in its rear edge, and connected to the lower end of the said lever 91 in a pivotal manner are curvilinear links 93 which are also pivotally connected to the levers 79 and 80, one to each lever. It will be noted that the forward ends of the links 93 overlap at the place of their pivotal connection to the lower end of the lever 91, Figure 2. Thus it will be seen that the oscillatory movements of the pendent lever 91 will be transmitted to the sprocket gear 77 for the continuous rotation of said sprocket gear 77 in the direction indicated by arrow in Figure 6. A link 94 connects the pendent lever 91 with the oscillatory operating lever 30 so that by oscillating the said lever 30 the operator of the velocipede is enabled through the driving connection described to propel the velocipede. In the preferred embodiment of my invention the link 94 is pivotally connected at its forward end, and is pivotally connected at its rear end to a yoke 95 which straddles the lever 91 and is provided with a spring actuated detent 96 adapted to enter the lever notches 92. By manipulating the detent 96 and adjusting the yoke 95 on the lever 91 the operator is enabled to regulate the movement of the lever 91 by the lever 30, as conditions demand. In this way the velocipede may be expeditiously and easily adapted for the use of children of various sizes.

As best shown in Figures 1, 2, 4 and 5 I provide another means whereby the velocipede may be adjusted for operation by children of various sizes. This latter means comprises a collar 97 loose on the lever 30 and to which the forward end of the link 94 is pivotally connected at 98; and it also comprises a collar 99 mounted on the lever 30 and connected through a rod 100 with the collar 97. As best shown in Figures 4 and 5 the collar 99 is a split collar with arms 101 at its ends, the said arms 101 having cam surfaces at their outer sides which are opposed to cam surfaces at the inner sides of the arms 102 of a bifurcated lever 103 which is fulcrumed on the pin 104 employed to effect connection of the collar 99 to the rod 100. When the hand lever 103 is positioned as shown in Figure 2, the collars 99 and 97 may be moved upwardly or downwardly on the lever 30 to position the forward connection of the link 94 as desired, and when the said lever 103 is swung vertically into the position shown in the other figures, the collar 99 will be clamped on and adjustably fixed to the lever 30.

It will be apparent from the foregoing that I have provided a velocipede that is capable of being operated to advantage by a child, and one that is possessed of the capacity of affording to a child a considerable amount of wholesome exercise and amusement. It will also be apparent that the velocipede is inexpensive in construction and as a whole is well adapted to withstand the rough usage to which velocipedes are ordinarily subjected by children.

It is within the purview of my broad invention to construct the main frame of the velocipede in any manner compatible with the purposes of the invention; and it is also within the purview of the invention to employ any type of operating lever and any connection between the said lever and the drive wheel that fall within the scope of my invention as defined in my appended claims.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination in a velocipede, of a main frame, a ground wheel, an oscillatory lever carried by the main frame, a driving connection operable by said lever to rotate the ground wheel incident to rocking of the lever, an operating lever carried by the main frame, and an adjustable connection between the operating lever and the first-named lever and movable relatively to said levers, with means on both of the levers whereby the said connection may be released for a change of position thereof.

2. In a velocipede, the combination of an oscillatory lever having notches at intervals in its length, a link, a yoke straddling the lever and to which the link is pivotally connected, and a spring pressed detent carried by the yoke and adapted to seat in the notches of the lever.

3. The combination in a velocipede, of an operating lever, a collar slidable thereon, a link connected to said collar, an upper collar slidable on the lever and connected with the first-named collar, said upper collar having arms with cam surfaces, and a bifurcated lever connected to the upper collar and having arms with cam surfaces to coöperate with those of the collar to clamp the collar on the lever.

In testimony whereof I affix my signature.

WALTER H. MORRIS.